Nov. 20, 1928.

E. BARTHELMESS

SILO

Filed Aug. 21, 1926

Inventor:
Emil Barthelmess

Patented Nov. 20, 1928.

1,692,610

UNITED STATES PATENT OFFICE.

EMIL BARTHELMESS, OF DUSSELDORF-OBERKASSEL, GERMANY.

SILO.

Application filed August 21, 1926. Serial No. 130,727, and in Germany August 22, 1925.

This invention relates to a silo of the kind adapted for use with powdery and granulated materials.

The discharge of such materials from the silos presents difficulties in that the materials, packed together by their own weight at the bottom of the silo, tend to arch and to prevent downward movement. This tendency is supported by the circumstance that the silo cells usually taper downwards towards comparatively small discharge apertures.

The object of the present invention is to facilitate the discharge, and the invention consists in the provision of a silo composed of an upwardly tapering chamber having discharge apertures which are uniformly distributed over the entire bottom. Preferably the bottom is stepped downwards towards the centre, the discharge apertures being situated in the vertical walls of the steps, and the discharge of the materials is effected by means of conveying screws which enter the silo through the discharge apertures.

Figure 1:
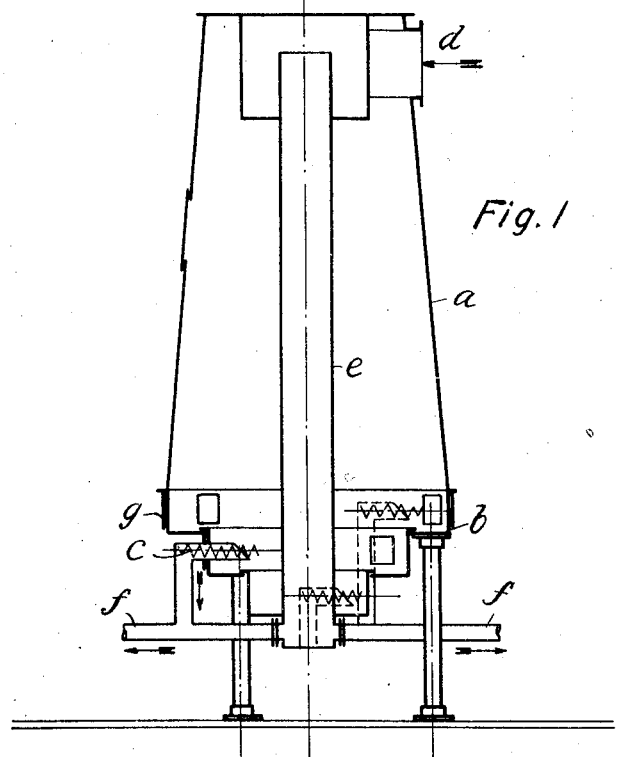
Figure 2:
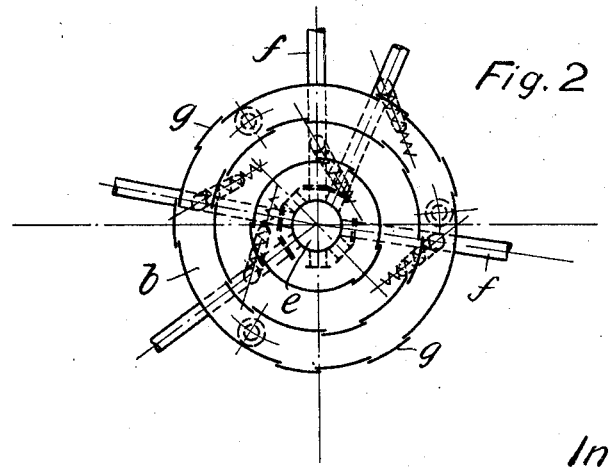

Fig. 1 of the accompanying drawings represents a sectional side view of the improved silo, and Fig. 2, a cross-section of the same.

The silo is composed of an upwardly tapering chamber $a$ having a bottom $b$ over which a plurality of discharge apertures $g$ are uniformly distributed. The bottom is stepped downward towards the centre, and the apertures $g$ are made in the vertical walls of the steps. Adjustable conveying screws $c$ are introduced through the apertures for discharging the materials. Rising centrally through the silo is a pipe $e$ through which the air that enters the silo together with the materials at $d$, can be discharged. Discharge pipes $f$ which radiate from the pipe $e$ underneath the silo, may also, as shown in Fig. 1, communicate with the conduits of the conveying screws for the reception and further transport of the materials.

The bottom $d$ is preferably composed of a plurality of nested sections which are loosely supported on one another.

I claim:

1. A silo of the character described comprising a bell-shaped, upwardly tapering single chamber having discharge apertures distributed uniformly over the bottom and disposed at different distances from the center.

2. A silo of the character described comprising a bell-shaped, upwardly tapering, single chamber having a stepped bottom presenting a plurality of vertical and horizontal walls, the bottom being provided with uniformly distributed discharge apertures made in said vertical walls.

3. A silo as claimed in claim 2 wherein the bottom is formed of nested rings of L-shaped cross-section.

4. A silo of the character described comprising a bell-shaped, upwardly tapering single chamber having a bottom which is stepped down towards the center and provided with uniformly distributed discharge apertures made in the vertical walls formed by the steps, and adjustable conveying screws entering the silo through said apertures for the discharge of the materials.

5. The structure claimed in claim 4 in combination with an air pipe rising centrally through the chamber, discharge pipes radiating from said central pipe underneath the bottom of the chamber, and pipes feeding the materials from the conveying screws into said discharge pipes.

EMIL BARTHELMESS.